United States Patent [19]

Firehammer et al.

[11] Patent Number: 5,002,299
[45] Date of Patent: Mar. 26, 1991

[54] GLIDE TRAILER

[75] Inventors: Carl D. Firehammer, Horicon; Douglas L. Case, Iron Ridge, both of Wis.

[73] Assignee: Soaring Industries, Inc., Iron Ridge, Wis.

[21] Appl. No.: 249,109

[22] Filed: Sep. 26, 1988

[51] Int. Cl.⁵ .................................................. B60P 3/10
[52] U.S. Cl. .................................... 280/414.1; 414/534
[58] Field of Search ...................... 280/414.1; 414/534, 414/535, 538

[56]  References Cited

U.S. PATENT DOCUMENTS

| 3,984,121 | 10/1976 | Dobosi | 280/414.1 |
| 3,993,324 | 11/1976 | Carrick | 280/414.1 |
| 4,033,600 | 7/1977 | Watson | 280/414.1 |
| 4,105,219 | 8/1978 | Gerson | 280/414.1 X |
| 4,429,893 | 2/1984 | Palamara | 280/414.1 |
| 4,448,438 | 5/1984 | DeWalk | 414/534 X |
| 4,530,634 | 7/1985 | Johnson | 414/534 |
| 4,681,334 | 7/1987 | O'Brien, Jr. | 280/414.1 |
| 4,697,976 | 10/1987 | Godbersen | 280/414.1 X |

FOREIGN PATENT DOCUMENTS

| 1384723 | 11/1964 | France | 280/414.1 |
| 708591 | 6/1966 | Italy | 280/414.1 |

Primary Examiner—Mitchell J. Hill
Attorney, Agent, or Firm—Donald Cayen

[57]  ABSTRACT

A glide system for boat trailers provides ease of loading and launching in an economical manner. The glide system comprises a plurality of glides for supporting a boat hull. Each glide comprises a support member made of a relatively soft and low-friction material. Brackets for mounting the support member to a trailer cross member provide pivoting of the support member relative to the trailer cross member and adjustments in at least two planes to obtain optimum support for the boat. The support members have curved sections at least in their transverse planes for contacting the boat hull with maximum contact area. The support members may be fabricated as single piece components. Alternately, the support members may be composed of structural members covered with respective bearing members that are made of a low-friction and relatively soft material.

4 Claims, 4 Drawing Sheets

GLIDE TRAILER

BACKGROUND OF THE INVENTION

1. Field of the Invention

This invention pertains to boat trailers, and more particularly to apparatus that facilitates launching and loading boats onto trailers.

2. Description of the Prior Art

Numerous kinds of trailers have been developed to load, transport, and launch boats. In general, boat trailers can be classified into two basic types: trailers having only rollers arranged to support the boat hull on the trailer frame, and trailers having two or more bunks that support the boat hull. Bunk trailers often include at least one roller, usually at the tongue end, to protect a portion of the boat hull while loading. Examples of roller trailers may be seen in U.S. Pat. Nos. 3,785,677; and 4,329,108. U.S. Pat. Nos. 3,917,087 and 4,464,092 show combination bunk-roller trailers.

Roller trailers possess the advantage of reducing the friction force that must be exerted in launching and loading a boat. On the other hand, roller trailers have several disadvantages. To adequately support a hull, a large number of rollers are required. The rollers must be adjustable to suit different boat hull configurations, and the adjustments must be made with care so that all the rollers share in supporting the hull. Even when all the rollers are in contact with the hull, the total support area provided by the rollers is relatively small. As a consequence, the rollers have a tendency to flatten, which eliminates the initial advantage of low-friction operation. Rollers also tend to dimple hulls, and some boat manufacturers do not warrant their boats if they are transported on roller trailers. In addition, to be effective, the rollers must be pivotable in one or more directions relative to the trailer frame. The large number of rollers, together with the various components needed to pivot and adjust them, results in objectionable expense. Further, the brackets for pivoting the rollers occupy space in a manner that places the rollers at a relatively great distance above the trailer frame. The result is that the center of gravity of a loaded boat is undesirably high above the ground. Another common problem associated with roller trailers is that boats easily become misaligned on the rollers as the boats are loaded from the water. Yaw misalignment is especially common and troublesome. As a result, boaters frequently must push their partially loaded boats back into the water and make additional attempts to load them in proper alignment with the rollers.

Bunk trailers have the advantages of low cost relative to roller trailers and of providing a large support area for the boat hulls. On the other hand, bunks produce large friction forces that must be overcome to launch or load a boat. In addition, bunks usually are made of wood covered with a carpet-like material, which deteriorate relatively quickly in marine use.

Thus, a need exists for a trailer having improved means for supporting boat hulls.

SUMMARY OF THE INVENTION

In accordance with the present invention, a trailer is provided that is capable of loading, transporting, and launching boats in an easier and more economical manner than was previously possible. This is accomplished by apparatus that includes a system of low friction glides that sturdily support a boat hull on the trailer frame.

The glide system is comprised of a series of independent glides that cooperate to provide ample distributed support for a boat hull. Each glide is composed of a structural member of adequate strength and rigidity to carry its share of the weight of the boat. Structural members may include tubes or solid pieces of various cross sections and materials.

Covering each structural member is a bearing member made of a low friction and relatively soft material. Suitable materials for the bearing member include synthetics such as nylon and polyvinylchloride plastics. The bearing member preferably has a rounded contour of relatively large radius that contacts the boat hull with a large bearing area. The bearing member may be joined to the structural member by any suitable means, such as adhesives or pop rivets. The bearing member may either fully or partially enclose the structural member.

Each glide further comprises one or more brackets for mounting to the trailer frame, with the structural member being pivotally fastened to the brackets. Structural member pivoting is limited in a manner that prevents a boat hull from contacting the various components of the trailer framework, such as a cross member or the axle. To accommodate boat hulls of varying configurations, the glide brackets are adjustable on the trailer in the trailer transverse directions. In addition, the structural members are vertically adjustable on their respective brackets. The adjustability of the glides enables the bearing members to engage a boat hull at the most advantageous locations for the particular hull. As many glides as necessary can be mounted to the trailer to suit the load carrying capacity and hull support placements required for a particular hull.

Further in accordance with the present invention, the structural and bearing members of each glide may be fabricated as a single low-friction component. In that situation, a preferred material is an ultra-high molecular weight polyethylene material. The ultra-high molecular weight polyethylene material can be molded, machined, or extruded to the desired shape and size for the particular application.

The low coefficient of friction of the polyvinylchloride bearing members, or of the single component ultra-high molecular weight polyethylene supports, greatly eases loading and launching of a boat from the trailer, even when the hull is dry. The low-friction bearing members also greatly reduce the problems associated with misalignment of a boat during the loading operation. Further, the relatively soft material of the hull contacting members allows frequent boat loading, transporting, and launching without damage to the hull.

Other advantages, benefits, and features of the invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
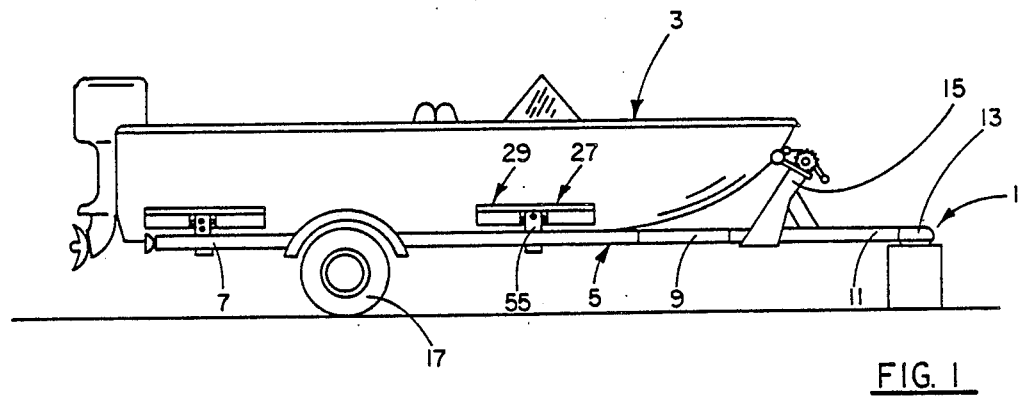
FIG. 1 is a side view of a boat trailer that advantageously employs the glide system of the present invention.
Figure 2:
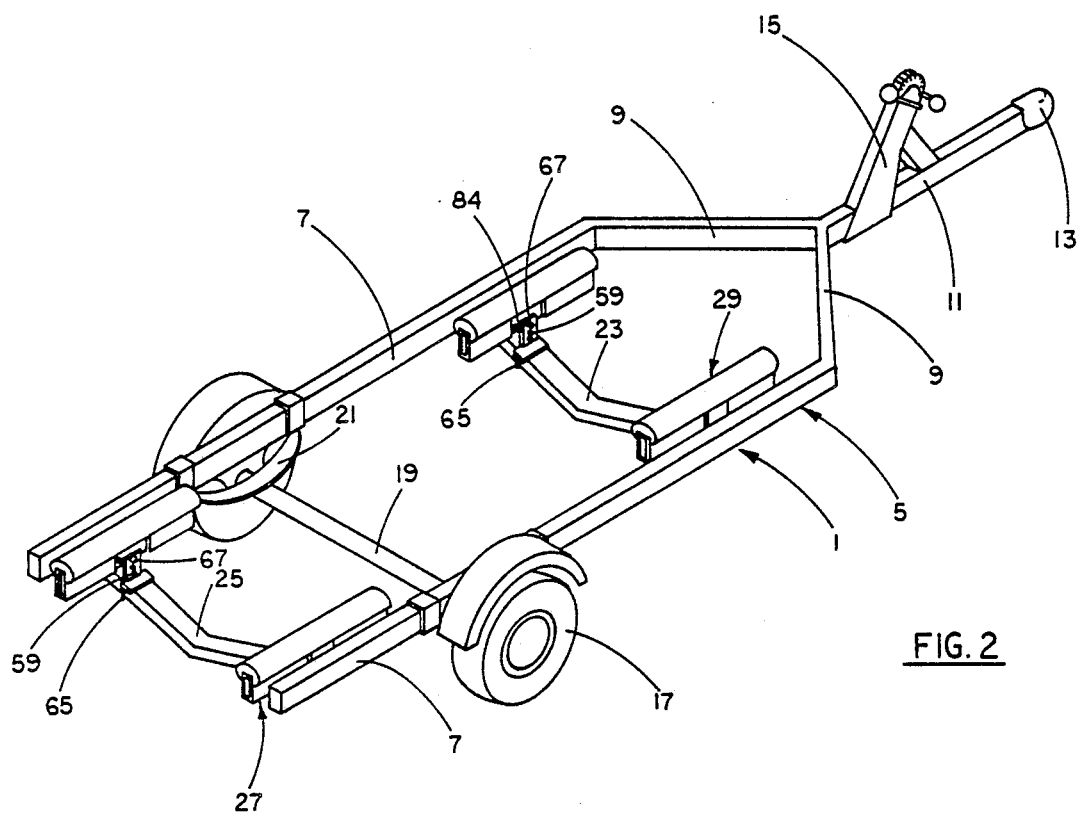
FIG. 2 is a perspective view of the trailer of FIG. 1.

Referring to FIGS. 1 and 2, a trailer 1 is illustrated that includes the present invention. The trailer 1 is particularly useful for loading, transporting, and launching boats 3, but it will be understood that the invention is not limited to marine applications.

The trailer 1 comprises a frame 5 that may be manufactured along generally conventional lines. As depicted, the frame 5 has a pair of longitudinally extending generally parallel side beams 7 that converge toward the trailer front end 9 into a tongue 11. The front end of the tongue 11 is provided with a known hitch 13 and a winch 15. The trailer is supported off the ground by tires 17 mounted to an axle 19. In turn, the axle 19 is mounted to the side beams 7 by respective spring assemblies 21. To space the side beams and to add structural rigidity to the trailer, cross members 23 and 25 are employed. While two cross members 23 and 25 are shown in FIG. 2, it will be appreciated that more or fewer cross members may be used. The ends of the cross members are joined to the side beams in any suitable manner, as, for example, by U-shaped brackets 26, FIG. 3. If desired, the cross members may be bowed downwardly toward their respective centers, as is known in the art.

In accordance with the present invention, the trailer 1 includes a glide system 27 that protectively supports the boat 3 on the frame 5. The glide system 27 comprises one or more glides 29 mounted to the frame, as by mounting the glides to the cross members 23 and 25. Depending on the construction of the boat hull, more than two glides 29 can be mounted to any or all of the trailer cross members.

Figure 3:
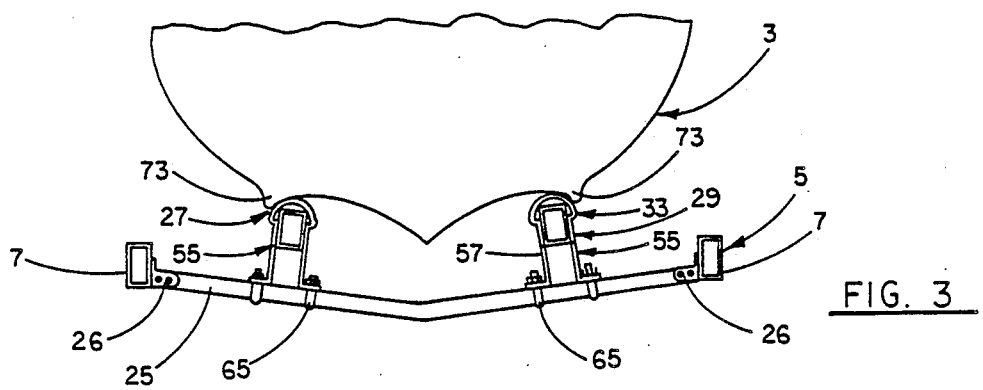
FIG. 3 is a partial back view of the trailer of FIG. 1.
Figure 4:
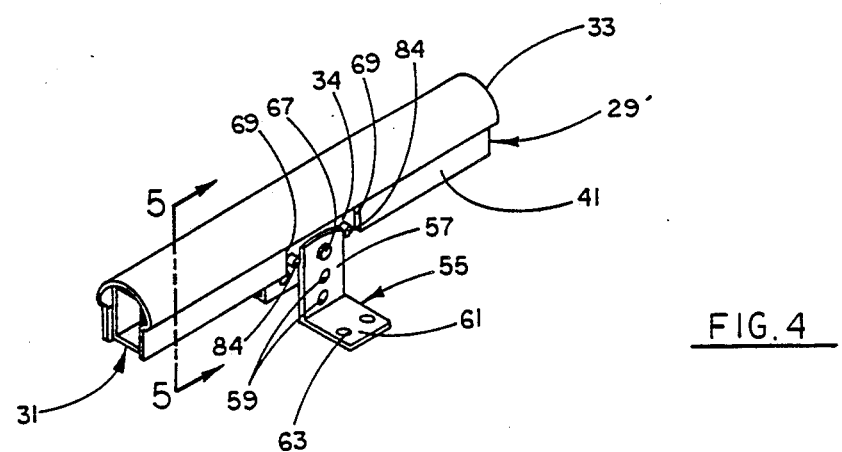
FIG. 4 is an enlarged perspective view of the glide of the present invention.
Figure 5:
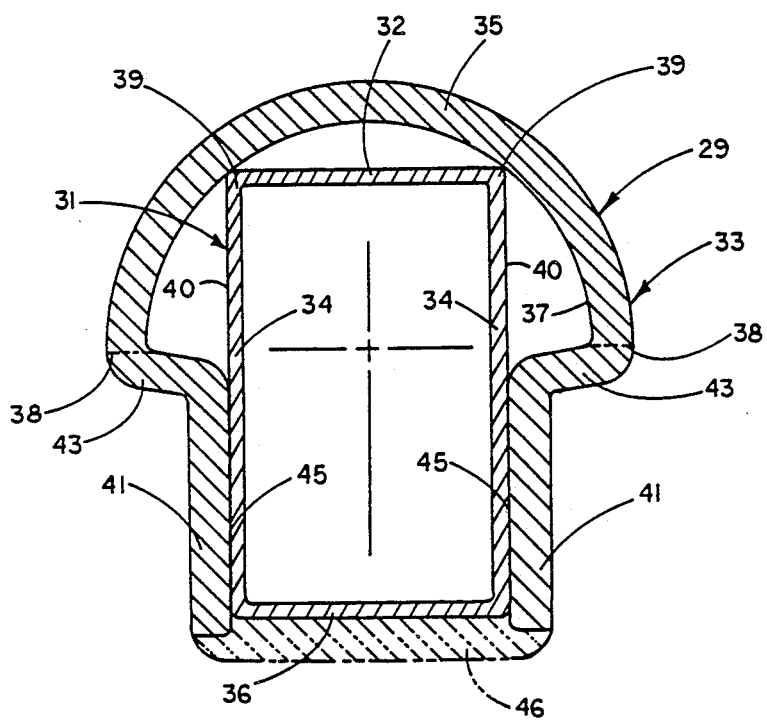
FIG. 5 is an enlarged cross sectional view taken along lines 5—5 of FIG. 4.

Looking especially at FIGS. 3–5, each glide comprises an elongated structural member 31. In the construction illustrated in FIGS. 2–5 and 7, the structural member 31 is a rectangular tube, but structural members having solid cross sections may also be used. The structural member 31 has top, side, and bottom walls 32, 34, and 36, respectively. The tube side walls 34 have opposed exterior side surfaces 40. The length of the structural member is designed to suit the contour of the particular boat hull to be supported on the trailer 1. The structural member may be straight in the longitudinal direction, or it may be curved slightly to suit a particular boat hull. The construction of the structural members mounted on the forward trailer cross member 23 need not be the same as the structural member on the rearward cross member 25 (FIG. 2).

Fastened to the structural member 31 of each glide 29 is a relatively soft and low-friction bearing member 33. At least the structural member top wall 32 is covered by the bearing member 33, and preferably at least the major portion of the side surfaces 40 are also covered. We have found that a polyvinylchloride plastic works very well as the bearing member 33. In the preferred embodiment, the bearing member is fabricated with a portion 35 that is curved in the transverse plane. The curved portion 35 terminates in longitudinally extending borders 38, FIG. 5. To provide maximum contact area with a boat hull, the curved portion 35 has a relatively large radius. The interior surface 37 of the curved portion 35 contacts the structural member 31 at two corners 39. The bearing member also includes a pair of short parallel side sections 41 that are joined to the curved portion 35 by oppositely extending legs 43, thus giving the bearing member a generally mushroom-shaped cross section. Fastening of the bearing member to the structural member may be by bonding the inner surfaces 45 of the bearing member side sections 41 to the structural member 31. Alternately, mechanical fasteners, such as rivets, not illustrated in the drawings, may be used. If desired, the bearing member may be fabricated with a closed cross section. In that case, a closure leg, represented by phantom line 46, constitutes an integral part of the bearing member. To assure that a boat hull does not contact the structural member 31, the bearing member is longer than the structural member, and the bearing member overhangs both ends of the structural member. The bearing members may be straight in their respective longitudinal directions, or they may be slightly curved to conform with any curvature of the underlying structural member.

To mount the glides 29 on the trailer 1, a pair of brackets 55 comprise a part of each glide. Each bracket 55 is manufactured with a first leg 57 that has at least one and preferably two or more holes 59 therethrough. Each bracket further comprises a second leg 61 that preferably has two holes 63 therethrough. Holes 63 receive U-bolts 65, which are used to secure the brackets to the trailer cross members 23 or 25. If the trailer cross members are bowed as is shown in FIGS. 2 and 3, the bracket legs 57 and 61 need not be at right angles to each other. Rather, the angle between the legs 57 and 61 may be chosen to orient the legs 57 vertically despite the bowed configuration of the cross member.

As best shown in FIG. 4, each structural member 31 is fastened to a pair of brackets 55 by a long bolt 67 extending through the structural member and aligned bracket holes 59. Preferably, just one bolt 67 is used with each glide, so that the structural member and bearing member are pivotable on the brackets about a trailer transverse axis. To permit direct fastening between the brackets and the structural member 31, the bearing member side sections 41 are cut out at 69.

To protect a boat 3 from striking a hard and rigid trailer component such as cross member 25 or axle 19 during loading, the amount of structural member pivoting about the bolts 67 is limited. Pivoting limitation may be by one or more short stop pins or studs 84 welded to the structural members 31 in close proximity to the bracket legs 57. As best shown in FIG. 4, the pins 84 are located on at least one of the structural member side walls 34 in the region exposed by the cutout 69 of a bearing member side section 41.

The use of several vertically spaced holes 59 in the bracket legs 57 enable the glide system 27 to be independently adjusted vertically relative to the trailer cross members 23 and 25. Further, as best shown in FIG. 3, the U-bolts 65 enable the glides 29 to be adjusted transversely along the trailer cross members. The combination of vertical and horizontal adjustments enable the glides to be arranged in the optimum locations under a boat hull 3, as, for example, against a hull's strakes 73. As many glides as necessary can be mounted to each of the cross members to provide the proper load carrying capacity and support locations for the boat. In addition, the length of each structural member and the diameter of the bearing member curved portion 35 can be custom designed to suit the particular application. The low-friction material of the bearing members 33 facilitates sliding the boat on the glides when loading or launching it, even when the hull and glides are dry. A particularly important advantage of the glide system is that it renders a boat self-aligning as the boat is winched onto the trailer. Consequently, a person can be less concerned than formerly about initial misalignment when he backs his trailer into the water and manipulates the boat over the trailer.

Figure 6A:
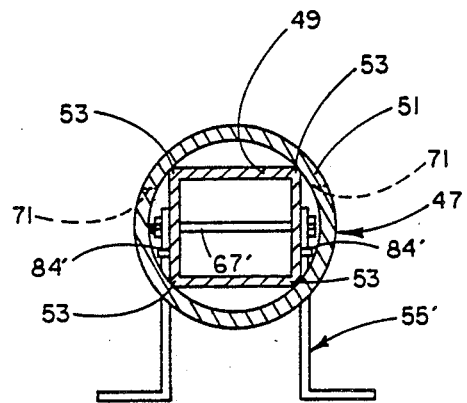
FIGS. 6a–6c are cross sectional views similar to FIG. 5, but showing respective modified glides according to the present invention.
Figure 6B:
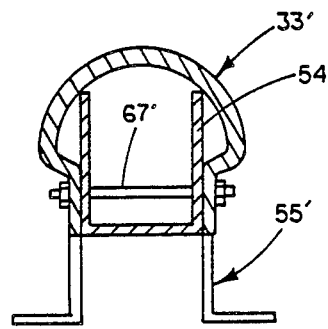
Figure 6C:
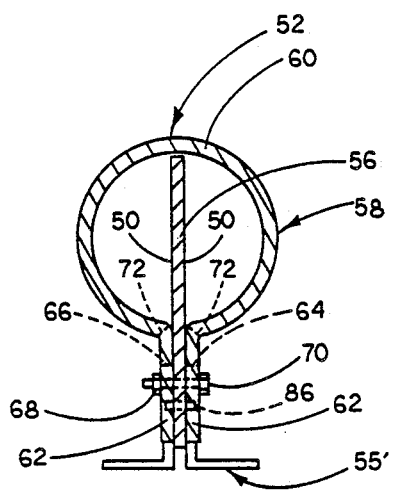

FIGS. 6a–6c exemplify the versatility of the glide system 27 of the present invention. In FIG. 6a, a glide 47 utilizes a square steel tube 49 as the structural member. The bearing member 51 is a round tube. Contact and bonding between the structural member 49 and the bearing member 51 occurs at the four tubing corners 53. The bearing member 51 is cut out at 71 to permit contact of the mounting brackets 55' with the structural member 49. One or more stop pins 84' are welded to the tube 49 in the area exposed by the cutout 71. The pins 84' are proximite to the brackets 55' at locations to strike the brackets and thereby limit the pivoting of the structural steel tube and round bearing tube to a predetermined amount.

Another configuration for the structural member may be a U-shaped channel, such as channel 54 of FIG. 6b. If desired, the channel 54 may be inverted from the orientation of FIG. 6b. The bearing member 33', brackets 55', and bolts 67' of FIGS. 6a and 6b are substantially identical to the corresponding parts described in connection with FIGS. 1–5. Although not shown in FIG. 6b, stop pins similar to the pins 84 and 84' described previously in connection with FIGS. 4 and 6a may be used with the glide of FIG. 6b.

FIG. 6c depicts a modified glide 52 having a structural member in the form of a flat plate 56. The bearing member 58 has a curved portion 60 and side sections 62 that are joined to the opposed surfaces 50 of the plate 56. The bearing member side sections 62 are cut out at 64 to clear the brackets 55'. In the bearing member 58, the curved portion boundaries 72 connect directly to the respective side sections 62. A pair of stop pins 86 extend from one or both sides of the plate 56. The pins 86 cooperate with the brackets 55' to limit pivoting of the plate and bearing member 58.

Figure 7:
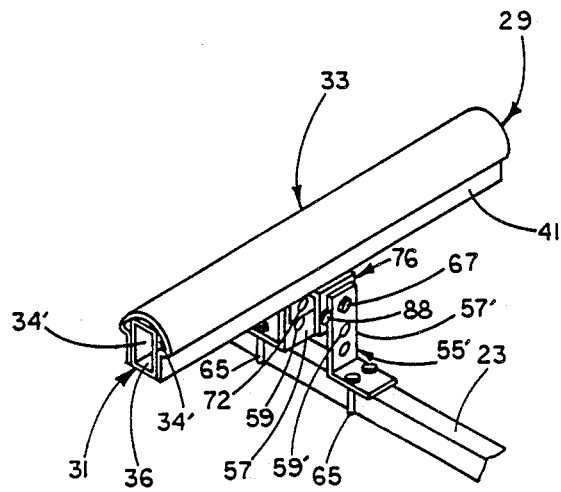
FIG. 7 is a view similar to FIG. 4, but showing an alternate design for mounting a glide to the trailer frame.

FIG. 7 shows a glide 74 having a modified design for mounting the glide to a trailer cross member 23 or 25. Rather than attaching the bracket legs 78 of the L-shaped bracket 80 directly to the glide structural member side walls 34', a U-shaped bracket 76 is fastened to the structural member bottom wall 36'. Fastening of the U-shaped bracket 76 to the structural member bottom wall 36' may be achieved by conventional machine screws, not illustrated in FIG. 7. The bolt 67' passes through aligned holes 82 in the side legs of the U-shaped bracket and through the selected holes 82 in the legs 78 of the L-shaped brackets 80. Suitable stop pins 88 are welded to the bracket 76 for striking the brackets 55 and limiting the pivoting of the structural member 31 and bearing member 33. With the design of FIG. 7, it is not necessary to cut out the side sections 41' of the bearing member 33'. Because of the U-shaped bracket 76, the legs 78 of the brackets 80 may be shorter than the corresponding legs 57 of brackets 55 described in connection with the glide 29 of FIGS. 2–4.

Figure 8:
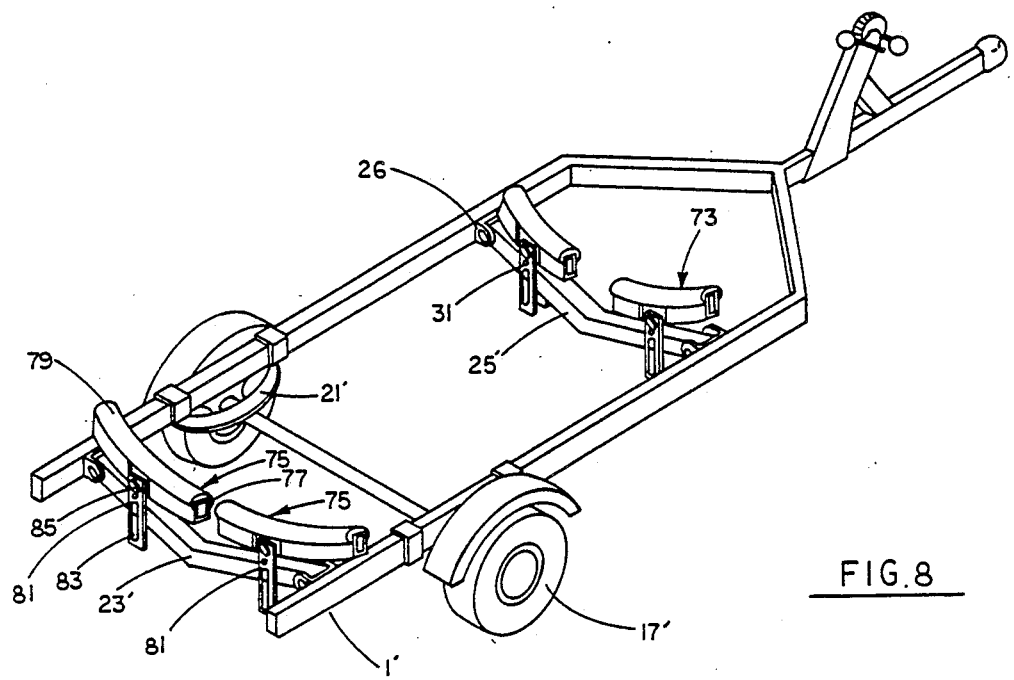
FIG. 8 is a perspective view of a modified embodiment of the present invention.

Now turning to FIG. 8, a modified embodiment of the present invention is illustrated that comprises a glide system 73. The glide system 73 may be used in connection with a trailer 1' that is similar in all respects to the trailer 1 described in connection with FIGS. 1–7. The glide system 73 comprises one or more glides 75 mounted to the trailer cross members 23' and 25'. Each glide 75 comprises a structural member 77 covered by a bearing member 79. The structural member 77 and bearing member 79 may have the same general cross sections as the corresponding members of the glides 29, 47, 52, and 74 described previously in connection with FIGS. 1–7. The structural members 77 of the glides 75 are curved relatively large amounts along their respective lengths, and the bearing members are also correspondingly curved. When mounted to the trailer cross members 23' and 25', the glides 75 on each cross member cooperate to form a transverse cradle for a boat hull. The glide mounted on the forward cross member 25' may have an entirely different curvature than the glide mounted to the rearward cross member 23'. In addition, the construction of a particular boat hull may require using only one glide on either or both cross members.

To mount the glides 75 to the trailer cross members 23' and 25', each glide includes suitable mounting brackets, such as plates 81 that straddle the respective cross members. The plates 81 may be fastened to the cross members in any suitable manner, such as with U-bolts 83. Bolts 85 passing through each structural member 77 and aligned holes in the associated plates 81 enable the glide to pivot transversely with respect to the trailer longitudinal axis. As with the glide system 27, as many transverse cross members 23' and 25' and glides 75 as desired may be used with the trailer 1' to fully support a particular boat hull. All of the glides are independently adjustable vertically and horizontally to suit the boat to be transported.

Figure 9:
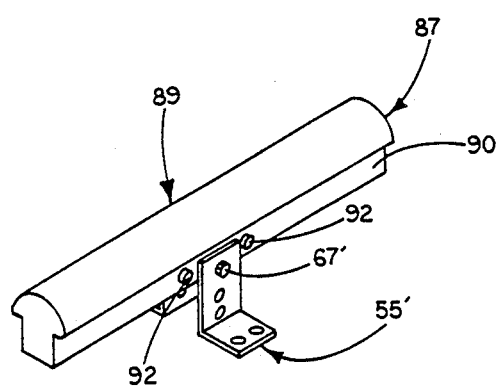
FIG. 9 is a perspective view of a modified embodiment of the present invention.

Further in accordance with the present invention, the structural member and bearing member of each trailer glide may be combined into a single component. Referring to FIG. 9, a glide 87 is depicted that has a sturdy anti-friction support 89. The support 89 is fabricated from a solid piece of strong, relatively soft, and low-friction material. A suitable material for the support 89 is an ultra-high molecular weight polyethylene material, such as is sold under the trademark Tivar-100. That material has excellent mechanical properties, including high strength, low coefficient of friction, and high machineability, that render it an excellent choice for the support. The support 89 is mounted to the trailer cross members 23 and 25 by brackets 55' that can be identical to the brackets 55 described previously with respect to FIGS. 1–7.

The support 89 is shown in FIG. 9 with a cross section having a mushroom-shaped outline similar to that of the bearing members 33, 33' and 79 shown in FIGS. 2–5, 6b, 7, and 8. Mounting bolt 67' passes through a hole drilled through the support side sections 90. Stop pins 92 are pressed into the support side sections 90 for contacting the brackets 55' and limiting support pivoting.

Figure 10:
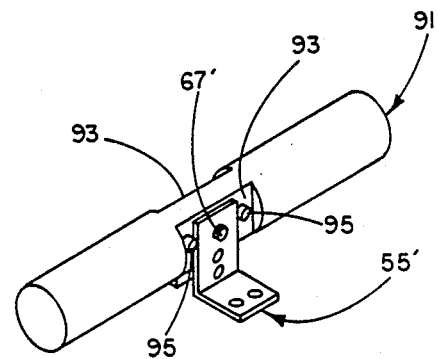
FIG. 10 is a perspective view of a further modified embodiment of the present invention.

It will be appreciated that other solid cross sections, such as cross sections shown in connection with FIGS. 6a and 6c, may also be used. In FIG. 10, for example, a support 91 is depicted that has a solid round cross section. The particular cross section chosen can be attained by molding, extruding, or machining the ultra-high molecular weight polyethylene material. The support 91 has opposed parallel flats 93 for cooperating with the brackets 55' to mount the support to a trailer cross member, not shown in FIG. 10. Mounting bolt 67' passes through a hole drilled between the flats 93. Stop pins 95 pressed into one or both flats 93 limit pivoting of the support 91. The supports 89 and 91 can be straight in their respective longitudinal directions, or they may be formed with curvatures. The single piece supports may be mounted to the trailer frame to pivot about axes parallel or perpendicular to the trailer longitudinal axis.

Thus, it is apparent that there has been provided, in accordance with the invention, a trailer glide system that fully satisfies the aims and advantages set forth above. While the invention has been described in conjunction with specific embodiments thereof, it is evident that many alternatives, modifications, and variations will be apparent to those skilled in the art in light of the foregoing description. For example, the cross section of the structural members typically illustrated at reference numberals 31, 49, 54, 56, and 77 may be of other shapes as well, such as L-shape, T-shape, and cruciform shape. Accordingly, it is intended to embrace all such alternatives, modifications, and variations as fall within the spirit and broad scope of the appended claims.

I claim:

1. A trailer for hauling cargo comprising:
   a. a longitudinally extending frame; and
   b. a glide system mounted to the frame for supporting the cargo thereon comprising:
      i. at least one elongated support member comprising an elongated structural member having opposed side surfaces, and a bearing member fastened to and covering at least a portion of the structural member in a position to contact the cargo, the bearing member being made from a soft and low-friction material, wherein the bearing member covers generally all of the structural member side surfaces, the bearing member defining a cut out portion that clears the bracket that is attached to a structural member side surface; and
      ii. bracket means for mounting the support member to the frame, the bracket means comprising at least one bracket attached between the structural member side surfaces and the frame.
   so that the cargo can be easily slid on the glide system for loading and unloading.

2. A trailer for hauling cargo comprising:
   a. a longitudinally extending frame;
   b. a glide system mounted to the frame for supporting the cargo thereon comprising:
      i. at least one elongated support member comprising an elongated structural member having opposed side surfaces, wherein the structural member comprises at least one transverse wall interposed between and joined to the opposed side surfaces to space the side surfaces apart by a selected distance, and a bearing member fastened to and cover at least a portion of the structural member in a position to contact the cargo, the bearing member being made from a soft and low-friction material; and
      ii. bracket means for mounting the support member to the frame,
   so that the cargo can be easily slid on the glide system for loading and unloading.

3. The trailer of claim 2 wherein the bearing member has a generally mushroom-shaped cross section.

4. The trailer of claim 2 wherein:
   a. the bracket means comprises at least one first bracket attached to the structural member, and a second bracket attached between the frame and the first bracket; and
   b. the bearing member covers substantially all of the structural member side surfaces.

* * * * *